United States Patent [19]

Lehmann et al.

[11] 3,925,101

[45] Dec. 9, 1975

[54] ELECTRIC PRIMARY CELL IN WHICH THE POSITIVE ACTIVE MATERIAL IS SILVER CHROMATE

[75] Inventors: Gerard Lehmann; Alfred Brych, both of Chasseneuil-du-Poitou, France

[73] Assignee: SAFT-Societe des Accumulateurs Fixes et de Traction, Romainville, France

[22] Filed: Jan. 7, 1975

[21] Appl. No.: 539,184

[30] Foreign Application Priority Data

Feb. 8, 1974 France ........................... 74.04280

[52] U.S. Cl. ........................ 136/100 R; 136/6 LN
[51] Int. Cl.² .................................. H01M 6/00
[58] Field of Search ............... 136/6 LN, 100 R, 166

[56] References Cited
UNITED STATES PATENTS 3,658,592 4/1972 Dey ........................... 136/6 LN
3,673,000 6/1972 Ruetschi ..................... 136/166 X
3,871,915 3/1975 Brych ......................... 136/6 LN

*Primary Examiner*—G. L. Kaplan
*Assistant Examiner*—C. F. Lefevour
*Attorney, Agent, or Firm*—Kenyon & Kenyon Reilly Carr & Chapin

[57] ABSTRACT

The invention relates to alkaline metal (e.g. Li) and silver chromate primary cells. It provides for use as a material for the positive casing of such a primary cell, stainless steel containing at least 11% of chromium, or up to about 17% chromium, or about 18% chromium with about 9% nickel, all percentages being by weight. With such positive casing, a corrosion of the casing during cell storage or discharge is delayed considerably.

5 Claims, 1 Drawing Figure

U.S. Patent  Dec. 9, 1975  3,925,101
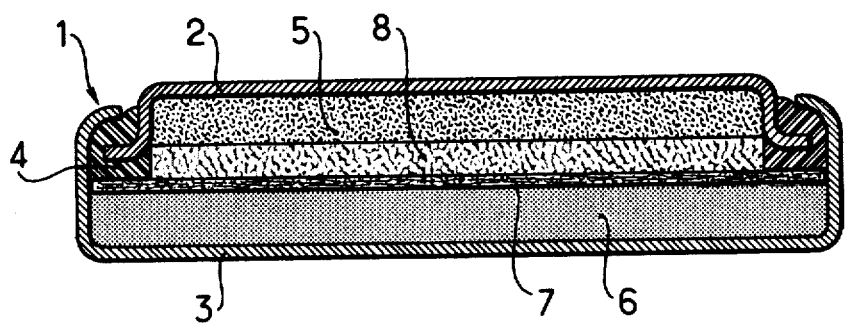

ELECTRIC PRIMARY CELL IN WHICH THE POSITIVE ACTIVE MATERIAL IS SILVER CHROMATE

BACKGROUND AND BRIEF SUMMARY OF INVENTION

The present invention concerns electric primary cells having high specific energy and, more particularly, alkaline metal (preferably lithium), silver chromate primary cells having an electrolyte whose solvent is aprotic. These primary cells have a very high open circuit voltage (greater than 3 volts) and the highly positive reactive material (silver chromate) has a corrosive effect on the part of the casing which contains it. Now, the use of primary cells in watches, for example, requires cell preservation both during long storage periods and throughout a long discharge period, e. g. a year or more.

It has been recommended that the positive part of the casing be prepared of nickel-plated steel. Indeed, nickel is a substance which will withstand the corrosive effect of silver chromate in the conditions in which the latter is used. However, the least defect in the nickel-plating is transformed into a deep crack after a few months of storage and permits the occurence of corrosive action on said casing via said crack.

The use of pure nickel for the positve part of the casing is too expensive a solution for that problem. Moreover, nickel is a relatively soft metal and its crimping during cell assembly crushes the edges and is likely to cause leakage.

An object of the present invention is to overcome that disadvantage and to provide a positive part of the casing which is not very expensive and withstands corrosion during very long cell storage and discharge periods.

Another object of the present invention is the provision of an electric primary cell in which the positive active material is silver chromate, the negative active material is an alkaline metal, preferably lithium and the electrolyte is a solution of a salt in an aprotic solvent and in which the active components are enclosed in a casing made of two electrically insulated parts, containing respectively the negative active material and the positive active material and each comprising at least a metallic portion acting respectively as the positive and negative terminals of the cell. In such a cell, the invention is characterized in that the metallic portion of the positive part of the casing (the part containing silver chromate) is made of steel of the type known as "stainless", containing at least 11% of chromium. On the other hand, the negative part which is not in contact with highly reactive materials, may be made of ordinary steel or of another alloy.

The stainless steel used for the positive part of the casing may contain, besides chromium, nickel in variable proportions.

The invention will be better understood by reference to the following examples illustrated by the single accompanying FIGURE which is a cross-sectional view of a cell embodying the invention.

DETAILED DESCRIPTION

Referring to the drawing, a primary cell 1 of the button type is shown in which the active materials are lithium and silver chromate. The casing consists of two cups, the negative material containing cup 2, the positive material containing cup 3, separated by a seal ring 4 made of polypropylene or other suitable material. The negative material containing cup 2 is made from nickel-plated steel foil and contains a lithium disk or mass 5 constituting the negative electrode of the cell. The positive mass 6 of the cell constituted by a mixture of about 99% by weight of silver chromate and about 1% by weight of carbon black is compressed into the positive material containing cup 3. The positive and negative electrodes are separated by a separator made of two constituents; the constituent 7 made of paper acting as a barrier positioned against the positive electrode and the constituent 8 made, for example, of spongy cotton, and more particularly, bearing the electrolyte (constituted by a molar solution of lithium perchlorate in propylene carbonate) imbibed therein and positioned against the lithium disk.

In a first embodiment of the cell 1 according to the invention, the positive material containing cup 3 was made of stainless steel containing about 12.5% by weight of chromium without nickel. In a second example, the cup 3 was made of stainless steel containing about 17% chromium, also without nickel. In a third example, the cup 3 was made of stainless steel containing about 18% chromium and about 9% nickel. It has been observed that in these three examples, the cells have been preserved without any trace of corrosion during several months of storage. In contrast, in a cell not according to the invention in which the cup 3 was made of a steel containing 5.5% chromium, traces of corrosion appear well before the end of the same storage period.

While specific embodiments of the invention have been disclosed herein, variations in practice within the scope of the appended claims are possible and are contemplated. There is no intention, therefore, of limitations to the exact disclosure hereinabove presented.

What is claimed is:

1. In an electric primary cell whose components comprise as positive active material silver chromate, as negative active material an alkaline metal, and as electrolyte a solution of a salt in an aprotic solvent and wherein the said components are enclosed in a casing comprising two parts electrically insulated from each other and containing respectively the negative active material and the positive active material, and said parts each comprising at least a metallic portion acting respectively as the positive and negative terminals of the cell, said cell being characterized in that the metallic portion of the positive part of the casing is made of stainless steel containing at least 11% by weight of chromium.

2. In a primary cell according to claim 1, said steel of said positive part besides containing chromium, also contains nickel.

3. In a primary cell according to claim 1, the proportion of chromium contained in said positive part is about 17% by weight.

4. In a primary cell according to claim 2, the proportion of chromium contained in said positive part is about 18% and the proportion of nickel contained therein is about 9% both percentages being by weight.

5. A primary electric cell comprising a positive electrode whose active material is silver chromate, a negative electrode whose active material is lithium, an electrolyte comprising a solution of a salt in aprotic solvent, a separator between said positive and negative electrodes, a casing comprising two parts respectively containing said negative and positive electrodes, means for electrically insulating said two parts from each other and sealingly enclosing said electrolyte, separator and electrodes in said casing, that one of said casing parts containing said silver chromate being of stainless steel with at least 11% by weight of chromium content.

* * * * *